(No Model.)
T. KELLER.
DRAFT EQUALIZER.
No. 484,371. Patented Oct. 11, 1892.
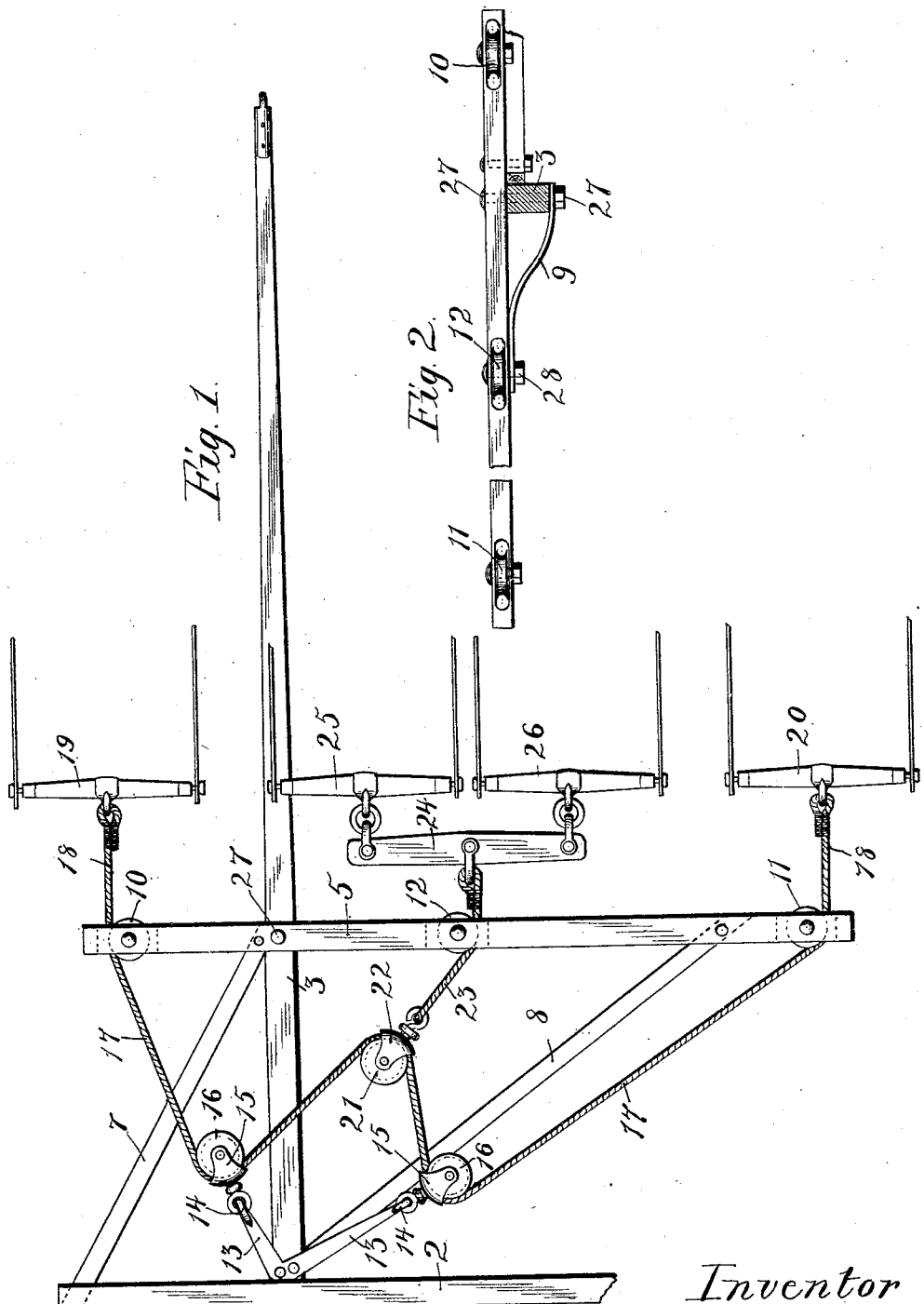
Witnesses
G. E. Purple
C. G. Hawley.
Inventor
Theodore Keller
By Paul Sherman Attys

UNITED STATES PATENT OFFICE.

THEODORE KELLER, OF TRIM BELLE, WISCONSIN, ASSIGNOR OF ONE-HALF TO VINCENT REEVES, OF MINNEAPOLIS, MINNESOTA.

DRAFT-EQUALIZER.

SPECIFICATION forming part of Letters Patent No. 484,371, dated October 11, 1892.

Application filed April 11, 1892. Serial No. 428,576. (No model.)

*To all whom it may concern:*

Be it known that I, THEODORE KELLER, of Trim Belle, in the county of Pierce and State of Wisconsin, have invented a certain Improved Draft-Equalizer, of which the following is a specification.

My invention relates to a draft-equalizer intended for use of four horses; and its object is to provide a simple, cheap, and successful equalizer for machines—such as large mowers, harvesters, and reapers—which require four horses to draw them, and in which the arrangement is such that but one horse can be placed on that side of the pole nearest to the grain.

The invention consists in the combination, with the pole and the main frame of the machine, whereto the pole is attached, of a fixed rigid cross-bar properly braced and containing three idler-pulleys—one at each end and one in the middle.

To a fixed part of the machine I secure two blocks and sheaves, around which a draft rope or chain extends and has its forward ends secured on single whiffletrees. A third block and sheaves engages the middle of the rope between the first-mentioned sheaves, and a short rope passes therefrom to an evener, in which two whiffletrees are attached. In this manner it will be seen that two horses are made to pull against the two outside horses, with half the advantage on the equalizer, thus when all of the ropes are taut giving to each of the four horses its proper share of the load, and as a consequence preventing any side draft.

The invention will be more readily understood by reference to the accompanying drawings, in which—

Figure 1 is a plan view of draft-equalizer embodying my invention, the same being shown in connection with the machine-frame pole and cross-bar. Fig. 2 is a front view of the cross-bar, showing manner of bracing the same with respect to the pole.

As shown in the drawings, 2 represents the forward portion of the mower, harvester, or reaper, or other machine from which the pole 3 projects. On the pole I secure the cross-bar 5 at a point about one-fourth back from the end of the cross-bar. The pole is braced with respect to the machine by the bar 7 and the cross-bar secured by the longer brace 8. The long end of the cross-bar is prevented from dipping down by the iron brace 9, extending from the lower side of the deep tongue 3. At the ends of the cross-bar are the two idler-pulleys 10 and 11, and at the middle thereof the idler-pulley 12. On the rear end of the tongue or to the frame 2 I rigidly secure the two arms 13, having the hooked ends 14, upon which the swivel-blocks 15 are fastened. Each block has a sheave 16. The arms 13 are preferably made of a single piece and diverge at an angle calculated to bring them into line with the outer sides of the sheaves 10 and 11, or, in other words, in the line of draft. The draft-rope 17 extends around the two sheaves 16, and its forward ends 18 are fastened to the single whiffletrees 19 and 20, respectively. Engaging the middle of the rope between the pulleys or sheaves 16 is the sheave 21, arranged in the block 22, which is fastened to the rear end of the short rope 23, which has its forward end passed around the pulley 12 and secured to the middle of the evener 24, which is provided with the two whiffletrees 25 and 26. As shown in Fig. 2, a strap 9 preferably extends from the main bolt 27, fastening the cross-bar to the pole to the pivot-bolt 28 of the middle pulley 12. The forward end of the pole is held up by a neck-yoke passing between the horses hitched to the whiffletrees 19 and 25. In this manner I am enabled to hitch one horse on the inside of the pole and three on the outer side, while at the same time avoiding any side draft on the machine, and by means of the middle pulley-block and sheave 21 distribute the load evenly between the four horses, as it is obvious that the outside horses have double the advantage of the inner pair.

Having thus described my invention, I claim as new and desire to secure by Letters Patent—

1. The combination, in a draft-equalizer, of the machine-frame, the pole attached thereto, with the cross-bar arranged on said pole, two fixed sheaves, a traveling sheave arranged between the same, a flexible connection passing from said sheaves, the ends of said connection extending out over the ends of said cross-bar, a flexible connection extending from said traveling sheave over the middle of said cross-bar, and the idlers and the evener and whiffletrees secured to said flexible connections, substantially as described.

2. The combination, in a draft-equalizer, of the machine-frame and the pole attached thereto, with the cross-bar arranged on said pole and braced with respect thereto, idler-pulleys arranged on said cross-bar at the ends and middle thereof, two fixed sheaves, a traveling sheave arranged between the same, a flexible rope or chain passing around said sheave, the ends of said rope extending around said pulleys on the ends of the cross-bar, a whiffletree attached to each end of the rope, an evener and whiffletrees, and a flexible connection extending therefrom over the middle thereof to said traveling sheave, substantially as described.

3. The combination, with the machine-frame and the pole attached thereto, of the cross-bar 5, secured on said pole and braced with respect thereto and said frame, the hooked arms 13, fixed on said frame, the sheave-blocks and sheaves secured thereto, the middle traveling sheave and sheave-block, the rope 17, passing back of the fixed sheaves and around the forward side of the traveling sheave, idler-pulleys arranged at the ends and middle of the cross-bar, a single whiffletree secured to each end of the rope, a short rope or chain 23, extending over the traveling sheave over the middle idler-pulley, and an evener and whiffletrees secured to said short rope, substantially as described.

4. The combination, with the machine-frame and the pole extending threfrom, of the cross-bar 5, secured on said pole, the brace 9, extending from the lower side of the said pole and the under side of said cross-bar, the three idler-pulleys arranged on said cross-bar, the fixed arms 13, arranged at the angle described, the sheave-blocks and sheaves attached to the forward ends of said arms, the flexible rope or chain passing about said sheaves and over the end pulleys on said cross-bar, whiffletrees attached to the ends of said rope or chain, an evener and two whiffletrees attached thereto, the short rope or chain 23, extending from said evener over the middle idler-pulley, and a traveling sheave-block and sheave secured to the rear end of said short connection and engaging the middle part of the rope or chain 17, substantially as described, and for the purpose specified.

In testimony whereof witness my hand this 1st day of April, 1892.

THEODORE KELLER.

In presence of—
JOHN T. BEDDALL,
CHARLES TABOR.